United States Patent
Misono

(10) Patent No.: US 9,371,028 B2
(45) Date of Patent: Jun. 21, 2016

(54) VEHICLE TOWING APPARATUS

(75) Inventor: Yoshimasa Misono, Takanezawa-machi (JP)

(73) Assignee: HONDA ACCESS CORP., Niiza-shi (JP)

( * ) Notice: Subject to any disclaimer, the term of this patent is extended or adjusted under 35 U.S.C. 154(b) by 921 days.

(21) Appl. No.: 13/403,523

(22) Filed: Feb. 23, 2012

(65) Prior Publication Data

US 2013/0101376 A1 Apr. 25, 2013

(30) Foreign Application Priority Data

Oct. 21, 2011 (JP) .................................. 2011-232233

(51) Int. Cl.
*B60P 3/12* (2006.01)

(52) U.S. Cl.
CPC ....................................... *B60P 3/125* (2013.01)

(58) Field of Classification Search
CPC ....................................................... B60P 3/125
USPC .................. 280/402; 414/563, 462, 463, 465
See application file for complete search history.

(56) References Cited

U.S. PATENT DOCUMENTS

| | | | |
|---|---|---|---|
| 3,428,332 A * | 2/1969 | McCance | 280/402 |
| 3,740,074 A * | 6/1973 | Coil | 280/402 |
| 4,592,564 A * | 6/1986 | Warnock et al. | 280/402 |
| 4,632,629 A | 12/1986 | Kooima | |
| 5,674,044 A | 10/1997 | Ranes | |
| 2009/0152830 A1 | 6/2009 | Berry | |

FOREIGN PATENT DOCUMENTS

| | | |
|---|---|---|
| GB | 2104869 A | 3/1983 |
| JP | 58-12810 A | 1/1983 |

* cited by examiner

*Primary Examiner* — Jonathan Snelting
(74) *Attorney, Agent, or Firm* — Westerman, Hattori, Daniels & Adrian, LLP

(57) ABSTRACT

A vehicle towing apparatus 1 includes a wheel cradle 5 provided on a rear of a automobile 2 serving as a towing vehicle and holds a front wheel 7 serving as a wheel of a vehicle 6 to be towed in the wheel cradle 5, the wheel cradle 5 including two arm members 21, 21 forming a space receiving a width of the front wheel 7 in a lateral direction, the each arm member 21 connecting a first end thereof to the automobile 2 with an attachment body 4 and connecting a second end to each other, thereby forming a closed holding region 24 holding the lower portion of the front wheel 7 to be inserted therein. Therefore, the structure of the wheel cradle 5 can be simplified, and the front wheel 7 can be stably held.

12 Claims, 3 Drawing Sheets

VEHICLE TOWING APPARATUS

BACKGROUND OF THE INVENTION

1. Field of the invention

This present invention relates to a vehicle towing apparatus.

2. Description of Related Art

As this kind of apparatus, a two-wheeled vehicle towing apparatus has conventionally been proposed in, for example, Japanese patent unexamined application publication No. S58-12810. This apparatus is configured such that a wheel cradle is connected to the rear of an automobile, and one of the wheels of the two-wheeled vehicle is placed and fixed on the wheel cradle, thereby towing the two-wheeled vehicle by the automobile. Here, the wheel cradle comprises an L-shaped steel at right and left sides thereof, and the L-shaped steel includes a longitudinal side portion elongated in a substantially vertical direction and a lateral side portion elongated in a front-back direction. Both ends of the L-shaped steel are connected by a wheel guiding steel elongated in an oblique direction. Between the right and left longitudinal side portions, there is provided a movable wheel adjustment board, while between the right and left lateral side portions, there is provided a wheel receiver. In this way, between the right and left wheel guiding steels, the front portion of the front wheel is abutted to the movable wheel adjustment board, and the lower portion of the front wheel is placed on the wheel receiver, thereby fixing the front wheel on the wheel cradle by a spring steel for anti-disengagement purpose.

In addition, another two-wheeled vehicle towing apparatus is disclosed in, for example, U.S. Pat. No. 5,674,044, which includes a wheel cradle, a diagonal member and a footplate. The wheel cradle is formed in an L-shape with a front-wheel axle bearing elongated in a substantially vertical direction and a bottom plate elongated in a front-back direction. The diagonal member is provided between the front-wheel axle bearing and the bottom plate, and the footplate is provided in the rear of the bottom plate so as to adjust an own position in a front-back direction. In this way, the front wheel is placed on the bottom plate of the wheel cradle and fixed thereon by a pin, thereby towing the two-wheeled vehicle.

SUMMARY OF THE INVENTION

According to the towing apparatus of Japanese patent unexamined application publication No. S58-12810, since the front wheel is fixed on the wheel cradle using the spring steel for preventing the wheel from coming off with the front and lower portions of the wheel being abutted to the wheel cradle, there are concerns that the wheel rattles due to the wheel moving back and forth with respect to the wheel cradle during the towing operation. Further, from a structural viewpoint, there is a need to provide a wheel guiding steel elongated in an oblique direction in order to regulate the lateral position of the wheel.

On the other hand, according to the towing apparatus of U.S. Pat. No. 5,674,044, the lengthwise position of the wheel can be regulated using the front-wheel axle bearing and the footplate by adjusting the lengthwise position of the footplate. However, adjustment of the lengthwise position of the footplate is complicated, and furthermore the diagonal member needs to be provided in order to regulate the lateral position of the wheel as is needed in Japanese patent unexamined application publication No. S58-12810, resulting in the structure thereof becoming complicated.

The present invention has been made to solve the foregoing problems, and it is, therefore, an object of the present invention to provide a vehicle towing apparatus which enables the front wheel to be held stably with a simple structure.

Means to Solve the Problems

In order to achieve the aforementioned object, the invention according to a first aspect is a vehicle towing apparatus including a wheel cradle to be installed on a rear of a towing vehicle for holding a wheel of a vehicle to be towed in the wheel cradle, wherein the wheel cradle includes:

right and left arm members spaced from each other to have a lateral spacing enough to accommodate the wheel in a lateral direction, in a manner such that a holding region holding the wheel in both lengthwise and lateral directions is formed by connecting a first end of each arm member to the towing vehicle and connecting a second end thereof to each other, the holding region allowing a lower portion of the wheel to be inserted therein to hold the wheel therein.

According to a second aspect of the present invention, the wheel cradle further includes an adjustment member between the two arm members, the adjustment member adjusting a longitudinal spacing of the wheel cradle.

According to third and fourth aspects of the present invention, the wheel cradle further includes a holding member between the right and left arm members, the holding member passing through the wheel.

According to fifth through seven aspects of the present invention, the vehicle towing apparatus further includes a postural maintenance unit maintaining the wheel cradle at a substantially horizontal position.

According to eighth through twelfth aspects of the present invention, the wheel cradle is tiltably held to the towing vehicle.

According to thirteenth through seventeenth aspects of the present invention, the vehicle towing apparatus further includes a fixing unit tiltably holding the wheel cradle relative to the towing vehicle.

According to the vehicle towing apparatus described in the first aspect of the present invention, the lower portion of the wheel is held in the holding region, so that the wheel cradle can be simplified and also the front wheel can be stably held.

According to the vehicle towing apparatus described in the second aspect of the present invention, the spacing in the lengthwise direction in the holding region is adjustable by means of the adjustment member, thereby adjusting the size of the holding region, in an appropriate manner, corresponding to the wheel to be held.

According to the vehicle towing apparatus described in the third and fourth aspects of the present invention, the wheel held on the wheel cradle can be held with the holding member passing therethrough, thereby preventing the wheel from dropping off from the wheel cradle.

According to the vehicle towing apparatus described in the fifth to seventh aspects of the present invention, the vehicle towing apparatus has the postural maintenance unit, thereby allowing the wheel cradle to be held at a substantially horizontal position.

According to the vehicle towing apparatus described in the eighth to twelfth aspects of the present invention, the wheel cradle is tilted backwards and away from the vehicle when it is in use, and rotated toward the vehicle when not in use, thus making a storage space for the wheel cradle compact.

According to the vehicle towing apparatus described in the thirteenth to seventeenth aspects of the present invention, convenience of users can be improved by rotating the wheel cradle toward the towing vehicle so that the wheel cradle is fixedly held to the towing vehicle with the same being stored therein.

DETAILED DESCRIPTION OF THE INVENTION

Figure 1:
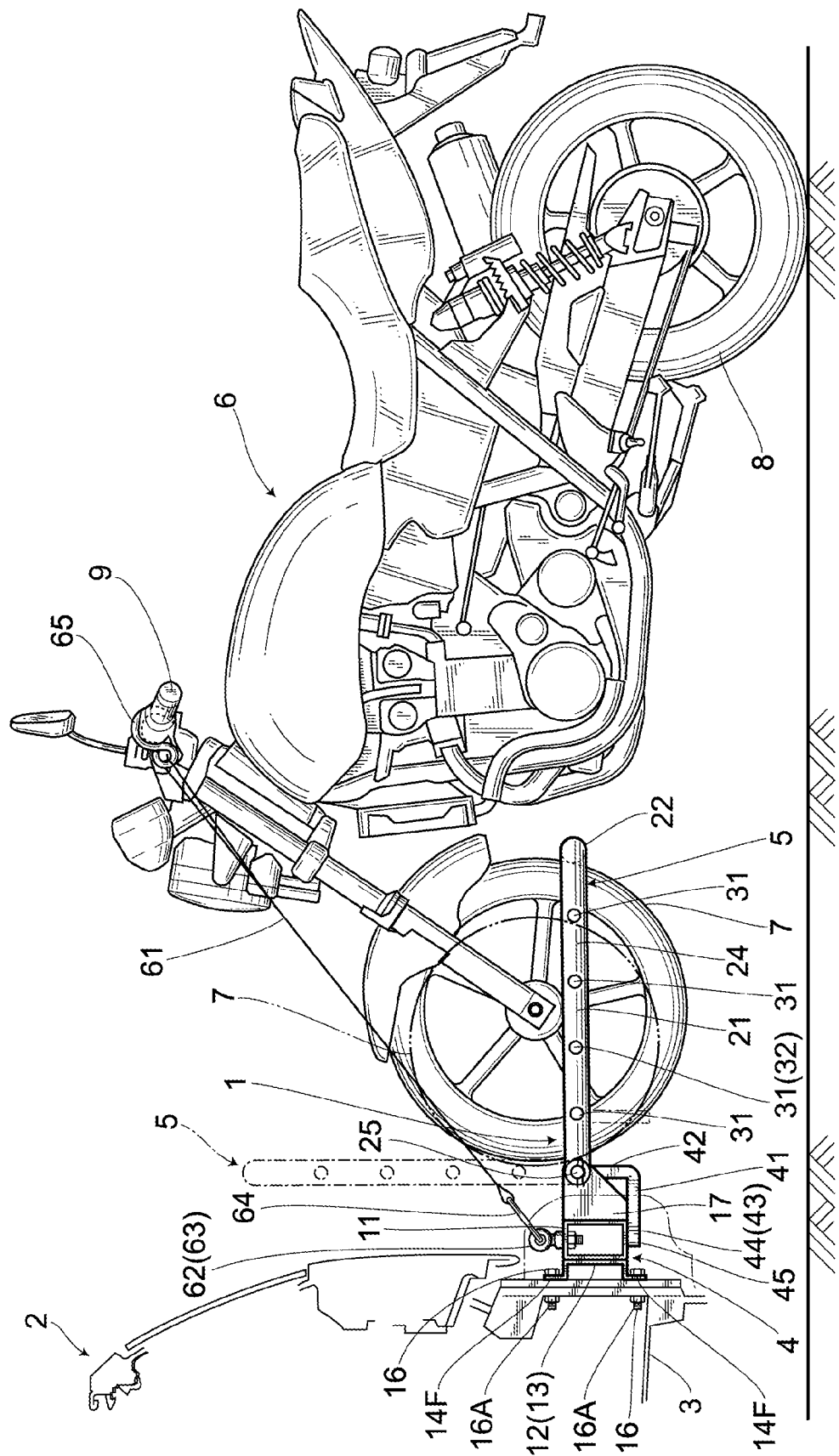
FIG. 1 is an overall side view of the towing apparatus according to a first embodiment of the present invention.
Figure 2:
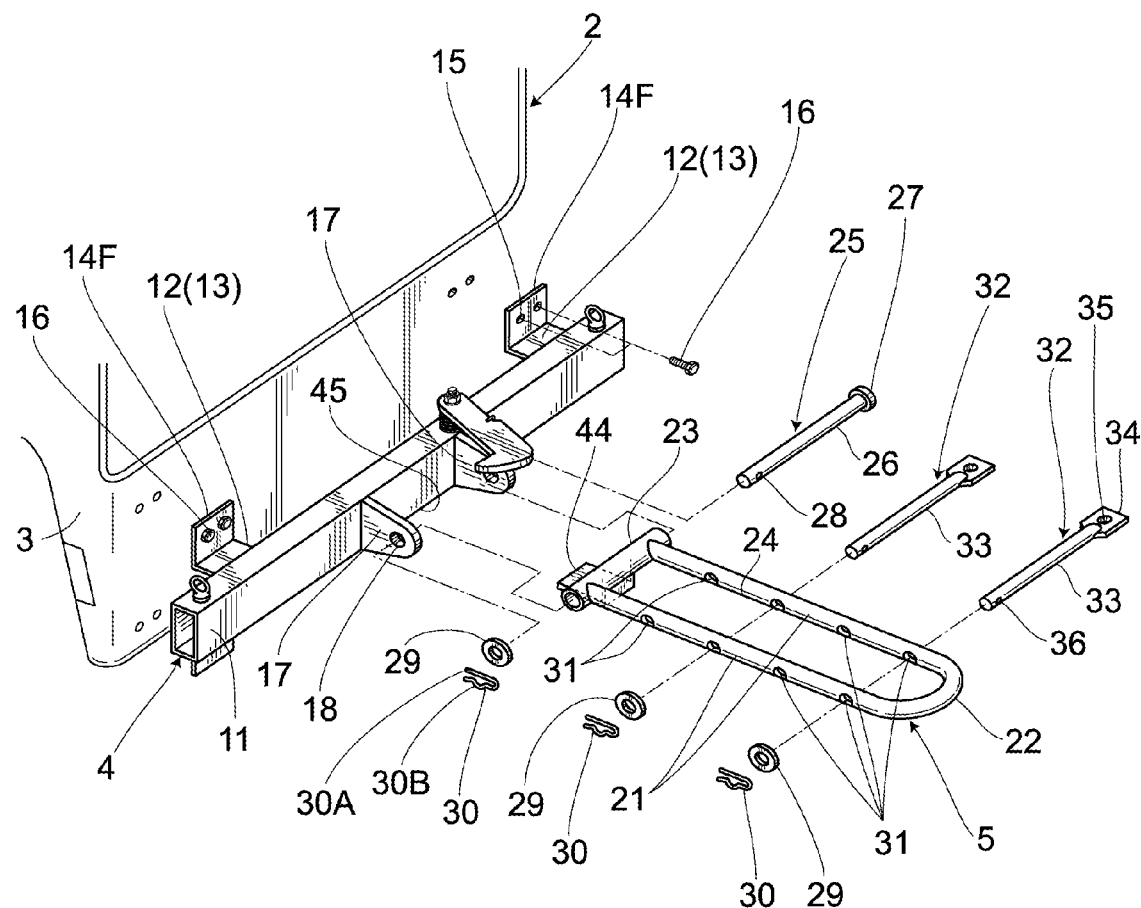
FIG. 2 is an exploded perspective view of the towing apparatus according to the first embodiment of the present invention.

With reference to the accompanying drawings, the vehicle towing apparatus of the present invention is described as follows.
(First Embodiment)

FIG. 1 through FIG. 4 illustrate a first embodiment of the present invention. As shown in the drawings, a vehicle towing apparatus 1 is attached to the rear of a automobile 2 serving as a self-propelled towing vehicle. The vehicle towing apparatus 1 comprises an attachment body 4 attached to the rear of a vehicle body 3 of the automobile 2 and a wheel cradle 5 rotatably connected to the attachment body 4. The wheel cradle 5 holds a front wheel 7, i.e., a wheel of a vehicle 6 to be towed. Note that the vehicle 6 to be towed may be a motorcycle, a bicycle or an auto three-wheel, for example.

The attachment body 4 comprises a lateral rod 11 made of a square pipe or the like. The lateral rod 11 is provided with two attachment brackets 12, 12 on the right and left sides on the front thereof. The attachment bracket 12 is integrally formed with a U-shaped main body 13 and upper and lower edge portions 14F, 14F, provided on the upper and the lower of the main body 13, respectively. These upper and lower edge portions 14F, 14F are each drilled to provide a through hole 15. In this way, the attachment body 4 is fixed to the vehicle body 3 through, for example, a bolt 16 and a nut 16A serving as a fixing unit, by inserting the bolt 16 through the through hole 15 and the rear of the vehicle body 3, and then fixing the bolt 16 with the nut 16A, thereby allowing the attachment body 4 to be fixed to the vehicle body 3. Further, near the center of the rear surface of the lateral rod 11, there are provided right and left attachment pieces 17, 17 serving as an attachment portion in a manner backwardly projected. Each attachment piece 17 is drilled to provide a through hole 18 in a lateral direction.

The wheel cradle 5 is formed with longitudinal arm members 21, 21 and a curved connecting portion 22. The arm members 21, 21 are placed on the right and left at a certain interval, and the connecting portion 22 connects the rear edges of the arm members 21, 21 placed in a substantially parallel manner. Specifically, a hollow pipe is bent into a U-shape so as to form the right and left arm members 21, 21 and the connecting portion 22, thereby allowing an interval or spacing between the arm members 21, 21 to accommodate the front wheel 7. Furthermore, the front edges of the arm members 21, 21 are connected with a rotating axle 23 elongated in a lateral direction which serves as a lower front side wheel receiving portion. The rotating axle 23 is made of a pipe member or the like. In this way, the arm members 21, 21, the connecting portion 22 and the rotating axle 23 form a closed holding region 24, thereby holding the front wheel 7 of the vehicle 6 to be towed in this holding region 24. In this case, the rotating axle 23 serves as a front side lower wheel part receiving portion supporting a lower front of a wheel, and the connecting portion 22 serves as a rear side lower wheel part receiving portion supporting a lower rear of a wheel.

The wheel cradle 5 is rotatably connected to the attachment body 4 by a connecting pin 25. The connecting pin 25 has a flange head 27 formed at one end thereof, the flange head 27 being larger than the diameter of a main pin body 26 of the connecting pin 25. On the other hand, the main pin body 26 is drilled to provide a through hole 28 formed at the other end of the connecting pin 25, the through hole 28 being elongated in a direction perpendicular to an axis center of the connecting portion 25. Thus, the main pin body 26 is loosely inserted through the through holes 18, 18 and the rotating axle 23 with the rotating axle 23 being held between the right and left attachment pieces 17, 17, while the end of the main pin body 26 is inserted through a washer 29, and then a snap pin 30 serving as a retaining pin is attached thereto, thereby fitting the connecting pin 25 to the through holes 18, 18 and the rotating axle 23 with the same held in place. In this way, the wheel cradle 5 is provided rotatably about the center of the connecting pin 25. In addition, the snap pin 30 has an inserting leg portion 30A made of a wire member and an elastic leg portion 30B bent into a curved shape, thereby allowing the inserting leg portion 30A to be inserted through the through hole 28, while allowing the elastic leg portion 30B to be fitted to the circumference of the main pin body 26, thus attaching the snap pin 30 thereto.

The right and left arm members 21, 21 are drilled to provide two or more pairs of attachment holes 31, 31 in a lateral direction. These attachment holes 31,31 are provided in a front-back direction at a substantially equal interval. Into these pairs of attachment holes 31, 31, a dual purpose pin 32 used as an adjustment member as well as a holding member is selectively inserted. The dual purpose pin 32 has a plate-shaped head 34 that is formed at one end thereof and larger than the diameter of a main pin body 33, and the head 34 is drilled to provide a through hole 35 serving as an operating portion. Further, the main pin body 33 of the dual purpose pin 32 is drilled to provide a through hole 36 that is formed at the other end thereof and elongated in a direction perpendicular to an axis center of the dual purpose pin 32. The main pin body 33 is movably inserted through the selected pair of the attachment holes 31, 31, and the end of the main pin body 33 is inserted through the washer 29, and then the inserting leg portion 30A is inserted through the through hole 36 and the elastic leg portion 30B is fitted to the circumference of the main pin body 33, thereby attaching the snap pin 30 to the end of the main pin body 33, thus attaching the dual purpose pin 32 to between the right and left arm members 21, 21. On the other hand, the dual purpose pin 32 can be detached from between the arm members 21, 21 by removing the snap pin 30. Note that the snap pin 30 is attached to the dual purpose pin 32 by inserting the inserting leg portion 30A through the through hole 36 and fitting the elastic leg portion 30B to the circumference of the main pin body 33.

Moreover, the vehicle towing apparatus 1 further includes a postural maintenance unit 41 maintaining the posture of the wheel cradle 5 at a substantially horizontal position. The postural maintenance unit 41 includes: a substantially L-shaped abutting member 44 having a first piece 42 and a second piece 43; and an abutment portion 45 to be abutted by the abutting member 44. When it is to be used, the first piece 42 is directed downward to be fixed to the rotating axle 23 with respect to the wheel cradle 5 held at a horizontal position, thereby allowing the second piece 43 to be directed forward in the horizontal direction, with the first piece 42 directed downward. Under such condition, the upper surface of the second piece 43 is abutted to the lower surface of the lateral rod 11 serving as the abutment portion 45, thereby holding the wheel cradle 5 at a substantially horizontal position as a usage position taken when in use. It is to be noted herein that the wheel cradle 5 at this usage position holds the front wheel 7 in a higher position than a rear wheel 8 of the vehicle 6 to be towed with the front wheel 7 being held on the wheel cradle 5.

Figure 3:
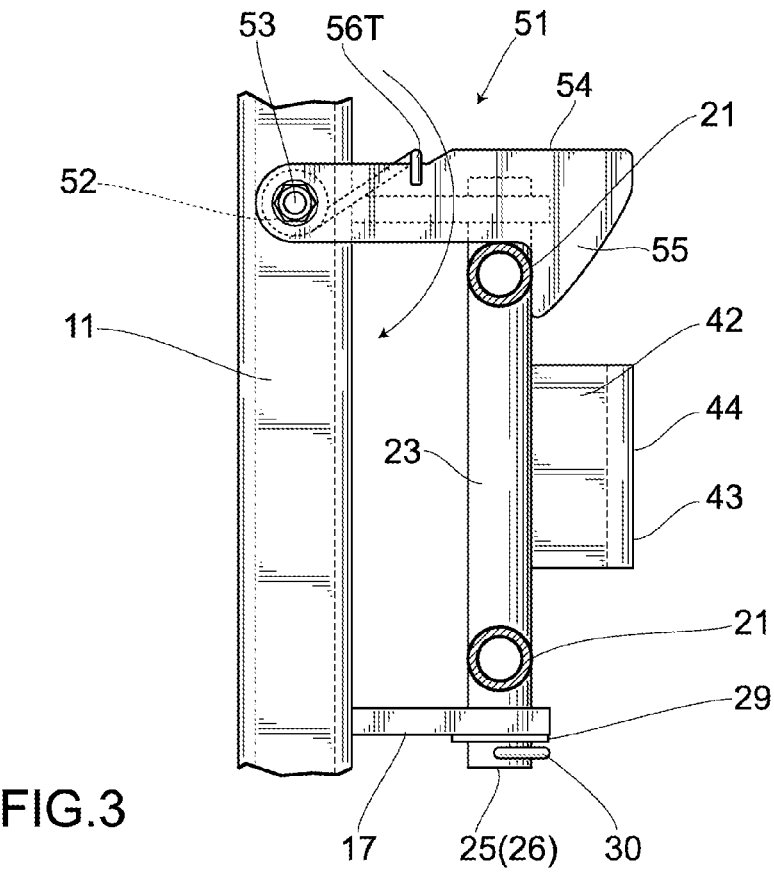
FIG. 3 is a partially cutaway top plan view of the main section of the towing apparatus according to the first embodiment of the present invention.
Figure 4:
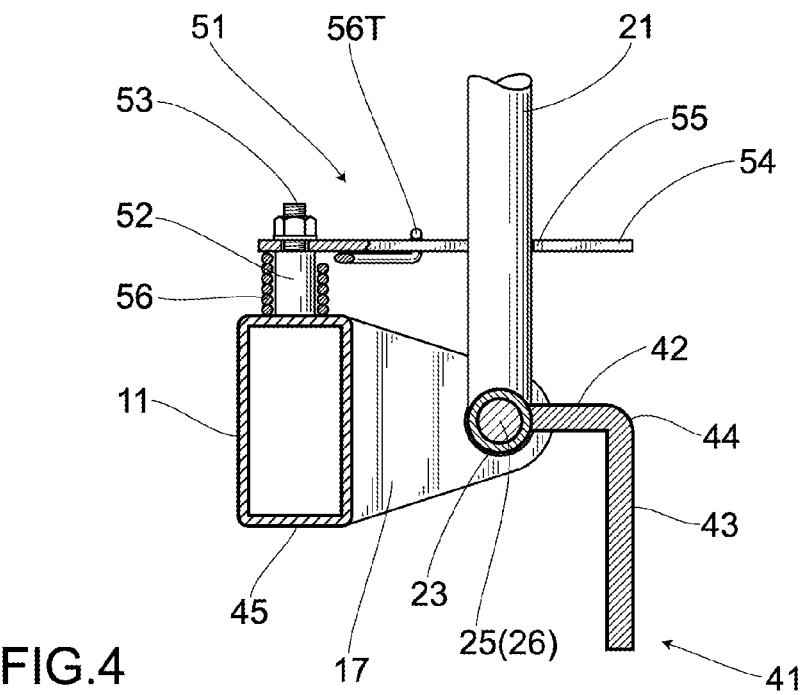
FIG. 4 is a partially cutaway vertical longitudinal sectional view of the main section of the towing apparatus according to the first embodiment of the present invention.

As shown in FIG. 3 and FIG. 4, the vehicle towing apparatus 1 further includes a fixing unit 51 fixing the wheel cradle 5 at a substantially vertical position as a stored or retracted position. The fixing unit 51 includes a cylindrical attachment portion 52 vertically provided on the lateral rod 11 in the vicinity of one of the arm members 21, 21, a fixing latch 54 provided in a manner horizontally rotatable by a pivoting portion 53 on the top of the attachment portion 52, and a hook-shaped locking portion 55 which is provided on the leading end of the fixing latch 54 and lockable to the arm member 21. The fixing unit 51 further includes a biasing means rotatably biasing the fixing latch 54 toward a direction in which the fixing latch 54 is locked to the arm member 21. The biasing means may, for example, be a coil spring 56. The coil spring 56 is set to the attachment portion 52 such that the attachment portion 52 is placed inside the coil spring 56. The one end of the coil spring 56 is fixed and the other end 56T thereof is locked to the fixing latch 54, thereby rotatably biasing the fixing latch 54.

Additionally, the lateral rod 11 is provided with a belt connecting portion 62 at the right and left sides thereof for connecting a belt 61 such as a tie-down belt. The belt connecting potion 62 includes a ring portion 63 fixed to the lateral rod 11 and an annular connecting portion 64 rotatably connected to the ring portion 63. The connecting portion 64 connects the one end of the belt 61, and the other end of the belt 61 has a hook 65. The hook 65 is locked to the handlebar 9 of the vehicle 6 to be towed. In this way, the belts 61, 61 are locked to the right and left sides of the handlebar 9 such that the belts 61, 61 are placed higher at the side close to the vehicle 6 to be towed and lower at the side close to the vehicle body 3. Furthermore, the belt 61 has a ratchet serving as a tightening means (not shown). This ratchet can appropriately adjust a tension of the belt 61. Moreover, the tension of the belt 61 is reduced by the ratchet, thereby allowing the belt 61 to be easily detachable.

Next, the usage of the above-structured vehicle towing apparatus 1 is explained. First, the front wheel 7 of the vehicle 6 to be towed is inserted between the arm members 21, 21 of the wheel cradle 5 placed at the usage position. The front wheel 7 is sandwiched by the right and left arm members 21, 21, and the lower front and the lower rear of the front wheel 7 are abutted to the rotating axle 23 and the connecting portion 22, respectively, thus being held therein. In this way, the front wheel 7 is inserted and held in the holding region 24. Under that condition, the lower portion of the front wheel 7 is placed below a virtual line formed by connecting the center of the connecting portion 22 with the center of the rotating axle 23. Note that the spacing between the connecting portion 22 and the rotating axle 23, as a spacing formed in a front-back direction of the wheel cradle 5, has a shorter distance than the outer diameter of the front wheel 7. Then, the right and left sides of the handlebar 9 are connected to the right and left sides of the lateral rod 11 by the belts 61, 61, respectively. Additionally, the dual purpose pin 32 is fitted into the specific pair of the attachment holes 31, 31 chosen from among the two or more pairs of the attachment holes 31, (i.e., the pair third from the right in FIG. 1) located at the position where the dual purpose pin 32 is insertable through the front wheel 7, thereby preventing the front wheel from coming off the wheel cradle 5. In this case, the dual purpose pin 32 is inserted through the inside of a rim of the front wheel 7. In this way, the front wheel 7 is fixed to the vehicle towing apparatus 1, and the vehicle 6 to be towed is towed by the automobile 2. In this case, the lower portion of the front wheel 7 is fixed to the wheel cradle 5 so as to be placed below the arm members 21, 21, thus performing the towing operation in a stable manner.

After the towing operation is over, the front wheel 7 is allowed to come off the wheel cradle 5 after removing the anti-disengagement dual purpose pin 32 and the belts 61, 61. Then, the wheel cradle 5 is rotated toward the front so as to stand substantially upright where the fixing latch 54 is locked to the arm member 21 at the substantially vertical position, thereby fixing the wheel cradle 5 at the stored or retracted position. In this case, the fixing latch 54 is provided with an operating portion (not shown). After rotating the fixing latch 54 in an anti-locking direction by using the operating portion, the fixing latch 54 is locked to the arm member 21. Preferably, there may be provided a stopper to prevent the wheel cradle 5 from forwardly rotating from the substantially vertical position by abutting the wheel cradle 5 thereon. Alternatively, the rotation in a front-back direction of the wheel cradle 5 may be regulated by forming the locking portion 55 of the fixing latch 54 in a substantially U-shape.

In the case of towing the vehicle 6 to be towed whose front wheel 7 has a smaller diameter, it can be performed in the following manner: Namely, the dual purpose pin 32 is fitted in the specific pair of the attachment holes 31, 31 located a distance from the rotating axle 23 shorter than the outer diameter of the smaller front wheel 7 (e.g., the ones at the right end in FIG. 1). Then, as shown in FIG. 1 using a two-dot chain line showing the smaller front wheel 7, the smaller front wheel 7 is inserted and held in the spacing surrounded by the arm member 21, 21, the rotating axle 23 serving as a lower front side wheel receiving portion and the dual purpose pin 32 serving as a lower rear side wheel receiving portion, and then the anti-disengagement dual purpose pin 32 and the belts 61, 61 are set to the positions, thereby towing the vehicle 6 to be towed. Alternatively, in FIG. 1, the dual purpose pin 32 may be fixed in the pair of attachment holes 31, 31 located on the far left. In this case, the smaller front wheel 7 is inserted and held in the holding region 24 surrounded by the arm member 21, 21, the connecting portion 22 serving as a lower rear side wheel receiving portion and the dual purpose pin 32 serving as a lower front side wheel receiving portion. Such dual purpose pin 32 can be used as a lower front side wheel receiving portion or a lower rear side wheel receiving portion, in the case of the smaller front wheel 7. In addition, compared to the smaller front wheel 7 shown by the two-dot chain line, the larger front wheel 7 is shown by the solid line in FIG. 1.

According to the present embodiment as described in the first aspect, the vehicle towing apparatus 1 includes the wheel cradle 5 to be installed on a rear of the towing vehicle or the automobile 2 for holding the front wheel 7 of the vehicle 6 to be towed in the wheel cradle 5, wherein the wheel cradle 5 comprises:

the right and left arm members 21, 21 spaced from each other to have a lateral spacing enough to accommodate the front wheel 7 in a lateral direction, in a manner such that the holding region 24 is formed by connecting a first end of each arm member 21 to the automobile 2 and connecting a second end thereof to each other, the holding region 24 thus allowing a lower portion of the front wheel 7 to be inserted therein to hold the front wheel 7 therein. Therefore, the structure of the wheel cradle 5 can be simplified, and at the same time. the front wheel 7 can be stably held.

According to the present embodiment as described in the second aspect, the wheel cradle 5 further includes the dual purpose pin 32 serving as an adjustment member detachably provided between the right and left arm members 21, 21, the dual purpose pin 32 adjusting a longitudinal spacing in a front-back direction of the wheel cradle 5. Therefore, the dual purpose pin 32 can adjust the the spacing or interval in the front-back direction of the holding region 24, thereby obtaining the appropriate size of the holding region 24 with respect to the front wheel 7 to be held, thus obtaining the highly versatile vehicle towing apparatus 1.

According to the present embodiment as described in the third and fourth aspects, the wheel cradle 5 further includes the dual purpose pin 32 serving as a holding member detachably provided between the right and left arm members 21, 21, the dual purpose pin 32 passing through the front wheel 7. Therefore, the dual purpose pin 32 can pass through the front wheel 7 held in the wheel cradle 5, thereby preventing the front wheel 7 from coming off the wheel cradle 5.

According to the present embodiment as described in the fifth to seventh aspects, the vehicle towing apparatus further includes the postural maintenance unit 41 holding the wheel cradle 5 at a substantially horizontal position, thereby allowing the wheel cradle 5 to be held at the substantially horizontal position.

Also, according to the present embodiment as described in the eighth to twelfth aspects, the wheel cradle 5 is tiltably held to the automobile 2 serving as a towing vehicle. Therefore, the wheel cradle 5 is tilted backwardly when in use and rotated toward the automobile 2 when not in use, thus achieving a small storage space for the wheel cradle 5.

According to the present embodiment as described in the thirteenth to seventeenth aspects, the wheel cradle 5 further includes the fixing unit 51 provided on a side close to the automobile 2 serving as a towing vehicle, the fixing unit 51 tiltably holding the wheel cradle 5, thereby allowing the wheel cradle 5 to be rotated toward the automobile 2 to be thus retracted. Therefore, convenience of users can be improved by fixedly holding the wheel cradle 5 with the same being stored or retracted.

Specifically, according to the present embodiment, since the rotating axle 23 serving as a lower front side wheel receiving portion is provided at the front end of the arm members 21, 21, the wheel cradle 5 is coupled to the vehicle body 3 in a manner rotatable around the rotating axle 23 while the lower front portion of the front wheel 7 can be supported using the rotating axle 23. Furthermore, since the two or more pairs of the attachment holes 31, 31 are provided on the arm members 21, 21 at substantially equal intervals and the dual purpose pin 32 is inserted through any desired pair of the attachment holes 31, 31, the dual purpose pin 32 can be used either as a front side lower wheel receiving portion or a rear side lower wheel receiving portion, and at the same time, it can be used for preventing the front wheel 7 from coming off the wheel cradle 5 by inserting itself through the front wheel 7. Moreover, the dual purpose pin 32 is attachable to or detachable from the arm members 21, 21 using the snap pin 30 serving as a fixing/unfixing means, and the through hole 35 serving as an operating portion is provided on the head 34 thereof. Therefore, the dual purpose pin 32 can be easily attached and detached by using the snap pin 30. Additionally, the belt connecting portions 62, 62 are provided on the right and left sides of the attachment body 4 or the rear of the vehicle body 3, and the attachment body 4 or the vehicle body 3 is connected to the vehicle 6 to be towed by using the belts 61, 61, thereby stably towing the vehicle 6 to be towed.

The present invention is not limited to the foregoing embodiment. In fact, various modified embodiments are possible within the scope of the gist of the present invention. For example, whilst the front portion of the holding region is closed with the rotating axle in the foregoing embodiment, the lower front portion of the wheel may be abutted to the attachment body instead of providing the rotating axle between the right and left arm members. In that case, the right and left arm members, the connecting portion and the attachment body define the closed holding region. This means that as long as the holding region can regulate the movement of the wheel, the holding region may be partially opened.

What is claimed:

1. A vehicle towing apparatus, comprising:
   a wheel cradle to be installed on a rear of a towing vehicle for holding a wheel of a vehicle to be towed in the wheel cradle, the wheel cradle comprising
      right and left arm members extending in a longitudinal direction spaced from each other to have a lateral spacing enough to accommodate the wheel in a lateral direction, in a manner such that a holding region holding and towing the wheel in both lengthwise and lateral directions is formed by connecting a first end of each arm member to the towing vehicle and connecting a second end thereof to each other, the holding region allowing a lower portion of the wheel to be inserted therein to hold the wheel therein,
      three or more pairs of attachment holes including a first pair and a second pair of the attachment holes provided in a lateral direction by drilling the right and left arm members,
      a first holding member inserted into the first pair of the attachment holes provided on the arm members near a center in an axial direction thereof in a manner penetrating the wheel to prevent the wheel from coming off the wheel cradle, and
      a second holding member inserted into the second pair of the attachment holes provided closer to either end of the arm members than the first holding member to support and put a tire of the wheel on the second holding member, such that a distance between a front end of the holding region and the second holding member or a distance between a rear end of the holding region and the second holding member is adjustable,
   wherein the number of pairs of attachment holes is greater than the number of holding members to be inserted thereinto, such that a distance between the first holding member and the second holding member is adjustable.

2. The vehicle towing apparatus according to claim 1, further comprising a postural maintenance unit maintaining the wheel cradle at a substantially horizontal position.

3. The vehicle towing apparatus according to claim 2, wherein the wheel cradle is tiltably held to the towing vehicle.

4. The vehicle towing apparatus according to claim 3, further comprising a fixing unit tiltably holding the wheel cradle relative to the towing vehicle.

5. The vehicle towing apparatus according to claim 1, wherein the wheel cradle is tiltably held to the towing vehicle.

6. The vehicle towing apparatus according to claim 5, further comprising a fixing unit tiltably holding the wheel cradle relative to the towing vehicle.

7. A vehicle towing apparatus, comprising:
   a wheel cradle to be installed on a rear of a towing vehicle for holding a wheel of a vehicle to be towed in the wheel cradle, the wheel cradle being formed by a hollow pipe bent into a U-shape and comprising
right and left arm members extending in a longitudinal direction spaced from each other to have a lateral spacing enough to accommodate the wheel in a lateral direction, in a manner such that a holding region holding and towing the wheel in both lengthwise and lateral directions is formed by connecting a first end of each arm member to the towing vehicle and connecting a second end thereof to each other, the holding region allowing a lower portion of the wheel to be inserted therein to hold the wheel therein,
three or more pairs of attachment holes provided in a lateral direction by drilling the right and left arm members, and
first and second holding members removably inserted into the attachment holes,
wherein the first holding member is selectively inserted into a first pair of the attachment holes to prevent the wheel from coming off the wheel cradle and to adjust a longitudinal spacing,
wherein the second holding member inserted into a pair of attachment holes other than the first pair of attachment holes, to support and put a tire of the wheel on the second holding member, such that a distance between a front end of the holding region and the second holding member or a distance between a rear end of the holding region and the second holding member is adjustable, and
wherein the number of pairs of attachment holes is greater than the number of holding members to be inserted thereinto, such that a distance between the first holding member and the second holding member is adjustable.

8. The vehicle towing apparatus according to claim 7, further comprising a postural maintenance unit maintaining the wheel cradle at a substantially horizontal position.

9. The vehicle towing apparatus according to claim 8, wherein the wheel cradle is tiltably held to the towing vehicle.

10. The vehicle towing apparatus according to claim 9, further comprising a fixing unit tiltably holding the wheel cradle relative to the towing vehicle.

11. The vehicle towing apparatus according to claim 7, wherein the wheel cradle is tiltably held to the towing vehicle.

12. The vehicle towing apparatus according to claim 11, further comprising a fixing unit tiltably holding the wheel cradle relative to the towing vehicle.

* * * * *